(12) United States Patent
Matsuda

(10) Patent No.: US 8,994,721 B2
(45) Date of Patent: Mar. 31, 2015

(54) INFORMATION PROCESSING APPARATUS, INFORMATION PROCESSING METHOD, AND PROGRAM FOR EXTENDING OR EXPANDING A VIEWING AREA OF CONTENT DISPLAYED ON A 2D WORKSPACE INTO A 3D VIRTUAL DISPLAY SCREEN

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 13/264,133

(22) PCT Filed: Mar. 17, 2010

(86) PCT No.: PCT/JP2010/054541
§ 371 (c)(1),
(2), (4) Date: Oct. 12, 2011

(87) PCT Pub. No.: WO2010/122859
PCT Pub. Date: Oct. 28, 2010

(65) Prior Publication Data
US 2012/0032955 A1 Feb. 9, 2012

(30) Foreign Application Priority Data
Apr. 23, 2009 (JP) .................... P2009-105294

(51) Int. Cl.
| G06T 15/00 | (2011.01) |
| H04N 13/00 | (2006.01) |
| G06F 3/0481 | (2013.01) |
| G06T 11/60 | (2006.01) |
| G06T 19/00 | (2011.01) |

(52) U.S. Cl.
CPC .......... *H04N 13/004* (2013.01); *G06F 3/04815* (2013.01); *G06T 11/60* (2013.01); *G06T 19/006* (2013.01)

USPC .......................................................... 345/419

(58) Field of Classification Search
None
See application file for complete search history.

(56) References Cited

U.S. PATENT DOCUMENTS 7,330,197 B2 *  2/2008  Kobayashi et al. ............ 345/633
2005/0285878 A1 * 12/2005  Singh et al. .................... 345/633
(Continued)

FOREIGN PATENT DOCUMENTS

| JP | 2006-154902 | 6/2006 |
| JP | 2008-304268 | 12/2008 |
| JP | 2008-304269 | 12/2008 |

OTHER PUBLICATIONS

A tangible AR desktop environment, Computer & Graphics 25 (2001) 755-763 by Holger Regnebercht et al.*
(Continued)

*Primary Examiner* — David Zarka
*Assistant Examiner* — Khoa Vu
(74) *Attorney, Agent, or Firm* — Sherr & Jiang, PLLC

(57) ABSTRACT

A configuration is realized which enables data not displayed on a display section to be always observed as a virtual object. A configuration is realized with which, in various kinds of display apparatus such as a PC and a portable telephone having a display section, non-displayed data that extends off the area of the display section is displayed as a virtual object at a position contiguous to the display data of the display section. This configuration allows the user to always observe and view not only data displayed on a limited display area of a PC or the like but also data that has gone off the display section, thereby enhancing data processing efficiency.

9 Claims, 14 Drawing Sheets

(56) References Cited

U.S. PATENT DOCUMENTS

| | | |
|---|---|---|
| 2006/0050087 A1* | 3/2006 | Tanimura et al. .............. 345/629 |
| 2006/0092131 A1* | 5/2006 | Kuroki ........................... 345/156 |
| 2009/0195538 A1* | 8/2009 | Ryu et al. ....................... 345/419 |
| 2010/0208033 A1* | 8/2010 | Edge et al. ...................... 348/46 |
| 2011/0205243 A1* | 8/2011 | Matsuda ......................... 345/633 |

OTHER PUBLICATIONS

Google Scholar search result for U.S. Appl. No. 13/264,133.*

International Search Report from the Japanese Patent Office, mailed Apr. 27, 2010, for International Application No. PCT/JP2010/054541.

* cited by examiner

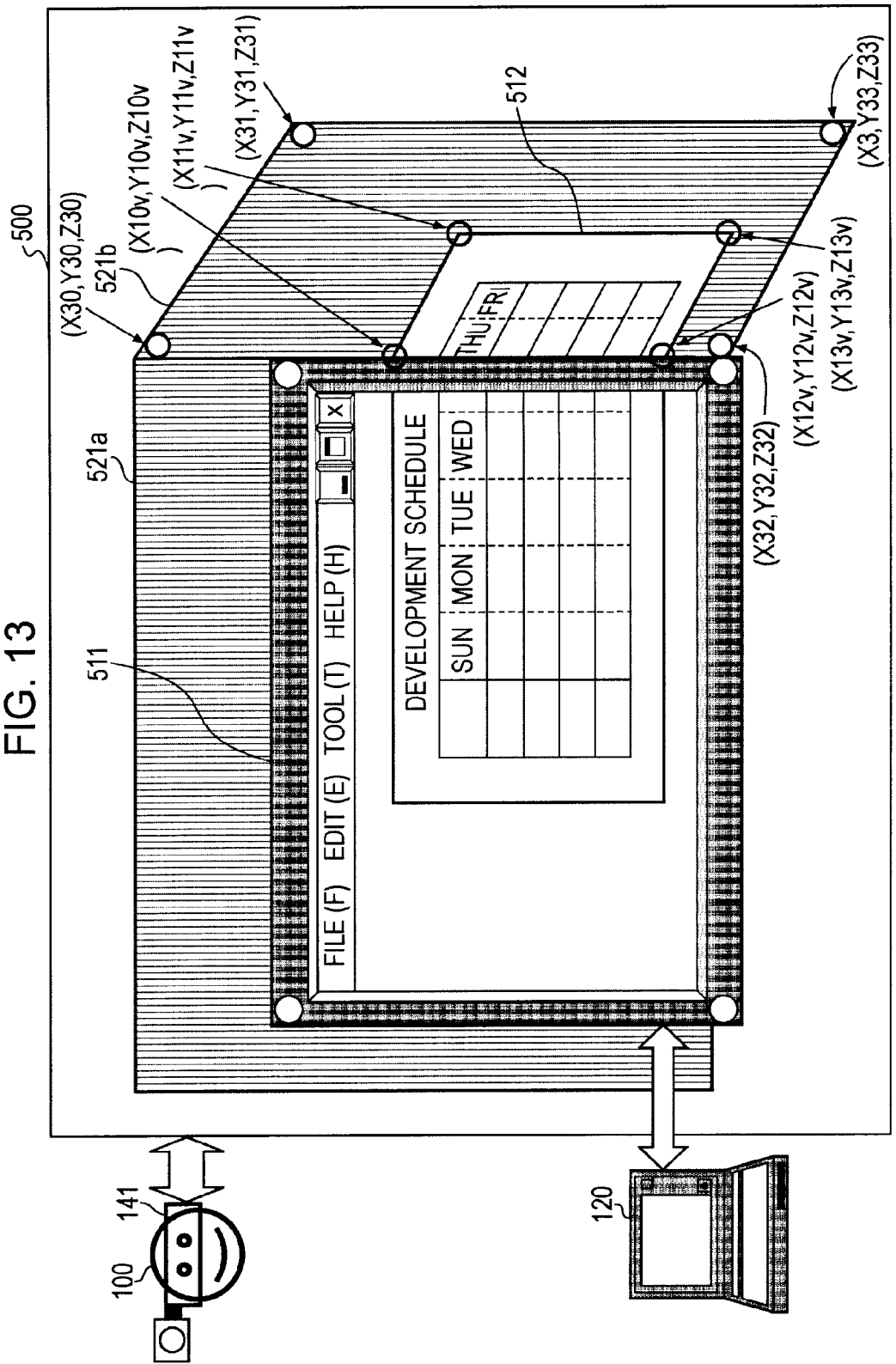

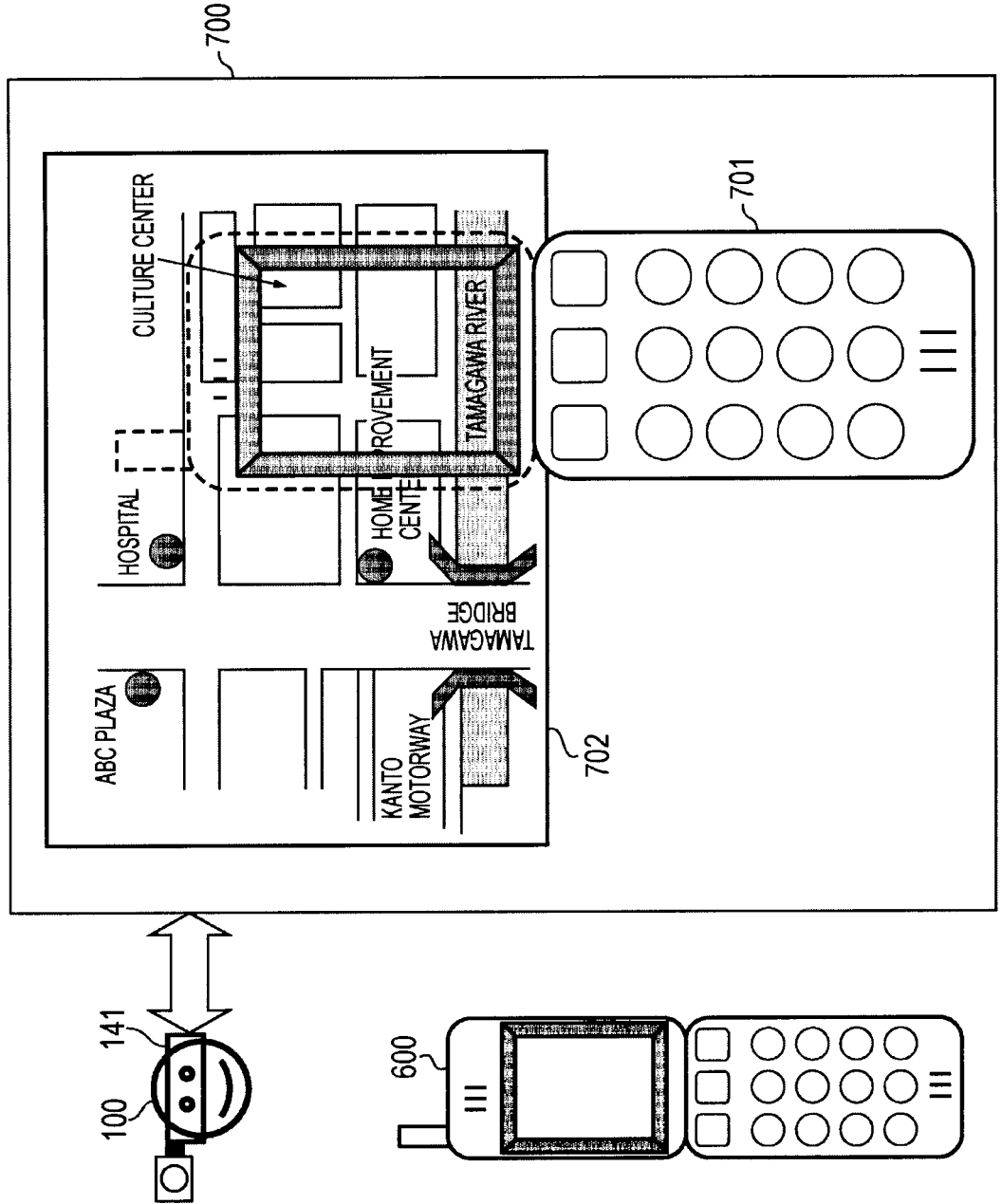

US 8,994,721 B2

INFORMATION PROCESSING APPARATUS, INFORMATION PROCESSING METHOD, AND PROGRAM FOR EXTENDING OR EXPANDING A VIEWING AREA OF CONTENT DISPLAYED ON A 2D WORKSPACE INTO A 3D VIRTUAL DISPLAY SCREEN

TECHNICAL FIELD

The present invention relates to an information processing apparatus, an information processing method, and a program. More specifically, the present invention relates to an information processing apparatus, an information processing method, and a program which perform data processing using Mixed Reality (MR) that merges a real object in the real world with electronic display.

BACKGROUND ART

For example, in the case when a user performs data processing using a PC (personal computer), the user performs processing on the data displayed on the display section (display) of the PC. However, for example, in the case of performing document creation, if the display size of the sheet applied to the document creation becomes larger than the size (e.g., the window size) of the display section of the PC, it is not possible to display the whole sheet within the PC screen, making it necessary to do work while displaying only a part of the sheet on the screen.

That is, information that extends off the screen is no longer displayed within the screen of the PC. To display the area that extends off the PC screen, while it is possible to display the area by doing a scrolling process, a problem arises in that the area that has hitherto been displayed becomes hidden as a result of the scrolling. To display the whole sheet, while it is possible to perform processing such as scaling down the whole sheet or splitting the screen in two, when such processing is performed, for example, a problem arises in that the character size becomes small, making it difficult to do work.

The present invention solves such a problem by using data processing that uses, for example, Mixed Reality (MR). It should be noted that as the related art describing Mixed Reality, for example, there exist PTL 1 (Japanese Unexamined Patent Application Publication No. 2008-304268) and PTL 2 (Japanese Unexamined Patent Application Publication No. 2008-304269). These literatures describe about a process of creating a three-dimensional map of the real world by using an image captured by a camera.

CITATION LIST

Patent Literature

PTL 1: Japanese Unexamined Patent Application Publication No. 2008-304268
PTL 1: Japanese Unexamined Patent Application Publication No. 2008-304269

SUMMARY OF INVENTION

Technical Problem

The object of the present invention is to provide an information processing apparatus, an information processing method, and a program, which generate a composite image in which various pieces of data are electronically attached to areas outside the display section (display) of a PC or the like, for example, through data processing using Mixed Reality (MR), and make this composite image observable, thereby enabling effective utilization of the spatial area outside the display section that is used as a main work area.

Solution to Problem

A first aspect of the present invention resides in an information processing apparatus including:

an application executing section that stores non-displayed data and positional information of the non-displayed data into a memory in data processing using a first display section, the non-displayed data being contiguous to display data of the first display section;

a three-dimensional information analysis section that analyzes a three-dimensional position of a real object including the first display section included in a camera-captured image; and a virtual object management section that takes input of the non-displayed data and the positional information of the non-displayed data which are stored in the memory, and three-dimensional positional information of the first display section analyzed by the three-dimensional information analysis section, generates a composite image formed by the real object included in the camera-captured image and a virtual object formed by the non-displayed data, and displays the composite image on a second display section, in which the virtual object management section sets a display position of the virtual object on the second display section, at a position located in a direction of extension from a boundary of the display data of the first display section displayed on the second display section to an outside of the first display section.

Further, in an embodiment of the information processing apparatus according to the present invention, the virtual object management section transforms coordinate data, which is the positional information of the non-displayed data stored in the memory, into a camera coordinate system serving as an indicator of a display position in a display image of the second display section, and determines the display position of the virtual object by applying the transformed coordinate data.

Further, in an embodiment of the information processing apparatus according to the present invention, the object management section judges whether or not an intersection occurs between the display position of the virtual object transformed into the camera coordinate system, and a plane forming the real object included in the camera-captured image, and if the intersection occurs, executes a coordinate re-transformation process so as to position the transformed coordinate data in the plane forming the real object, and determines the display position of the virtual object by applying the re-transformed coordinate data.

Further, in an embodiment of the information processing apparatus according to the present invention, the information processing apparatus includes a first apparatus having the application executing section, and a second apparatus having the three-dimensional information analysis section, and the virtual object management section, and data stored into a first memory in the first apparatus by the application executing section is transferred to the second apparatus via a communication section, and in the second apparatus, the three-dimensional information analysis section and the virtual object management section perform processing using received data.

Further, a second aspect of the present invention resides in an information processing method which is executed in an information processing apparatus, including:

an application executing step of an application executing section storing non-displayed data and positional information of the non-displayed data into a memory in data processing using a first display section, the non-displayed data being contiguous to display data of the first display section;

a three-dimensional information analysis step of a three-dimensional information analysis section analyzing a three-dimensional position of a real object including the first display section included in a camera-captured image; and a virtual object management step of a virtual object management section taking input of the non-displayed data and the positional information of the non-displayed data which are stored in the memory, and three-dimensional positional information of the first display section analyzed by the three-dimensional information analysis section, generating a composite image formed by the real object included in the camera-captured image and a virtual object formed by the non-displayed data, and displaying the composite image on a second display section, in which the virtual object management step has a step of setting a display position of the virtual object on the second display section, at a position located in a direction of extension from a boundary of the display data of the first display section displayed on the second display section to an outside of the first display section.

Further, a third aspect of the present invention resides in a program for causing information processing to be executed in an information processing apparatus, including:

an application executing step of causing an application executing section to store non-displayed data and positional information of the non-displayed data into a memory in data processing using a first display section, the non-displayed data being contiguous to display data of the first display section;

a three-dimensional information analysis step of causing a three-dimensional information analysis section to analyze a three-dimensional position of a real object including the first display section included in a camera-captured image; and a virtual object management step of causing a virtual object management section to take input of the non-displayed data and the positional information of the non-displayed data which are stored in the memory, and three-dimensional positional information of the first display section analyzed by the three-dimensional information analysis section, generate a composite image formed by the real object included in the camera-captured image and a virtual object formed by the non-displayed data, and display the composite image on a second display section, in which the virtual object management step has a step of causing a display position of the virtual object on the second display section to be set, at a position located in a direction of extension from a boundary of the display data of the first display section displayed on the second display section to an outside of the first display section.

It should be noted that the program according to the present invention is, for example, a program that can be provided by a storage medium or communication medium which is provided in a computer-readable format to an image processing apparatus or computer system capable of executing various program codes. By providing such a program in a computer-readable format, processes according to the program are implemented on the image processing apparatus or computer system.

Other objects, features, and advantages of the present invention will become apparent from the following detailed description of embodiments of the present invention and the accompanying drawings. It should be noted that the term system as used in this specification refers to a logical aggregation of a plurality of apparatuses, and is not limited to one in which the constituent apparatuses are located within the same casing.

Advantageous Effects of Invention

According to the configuration of an embodiment of the present invention, a configuration is realized with which, in various kinds of display apparatus such as a PC and a portable telephone having a display section, non-displayed data that extends off the area of the display section is displayed as a virtual object at a position contiguous to the display data of the display section. This configuration allows the user to always observe and view not only data displayed on a limited display area of a PC or the like but also data that has gone off the display section, thereby enhancing data processing efficiency.

BRIEF DESCRIPTION OF DRAWINGS

FIG. 13 is a diagram explaining about a specific processing example illustrating an example of processing executed by the information processing apparatus according to the present invention.

FIG. 14 is a diagram explaining about a specific processing example illustrating an example of processing executed by the information processing apparatus according to the present invention.

DESCRIPTION OF EMBODIMENTS

Hereinbelow, an information processing apparatus, an information processing method, and a program according to the present invention will be described in detail with reference to the drawings.

The present invention will be described in order in accordance with the following topics.

1. With regard to a configuration example and a processing example of an information processing apparatus according to the present invention (Embodiment 1)
2. Display process of a virtual object adapted to the shape of an object in the real world (Embodiment 2)
3. Processing example using another display apparatus

[1. With Regard to a Configuration Example and a Processing Example of an Information Processing Apparatus According to the Present Invention]

Figure 1:
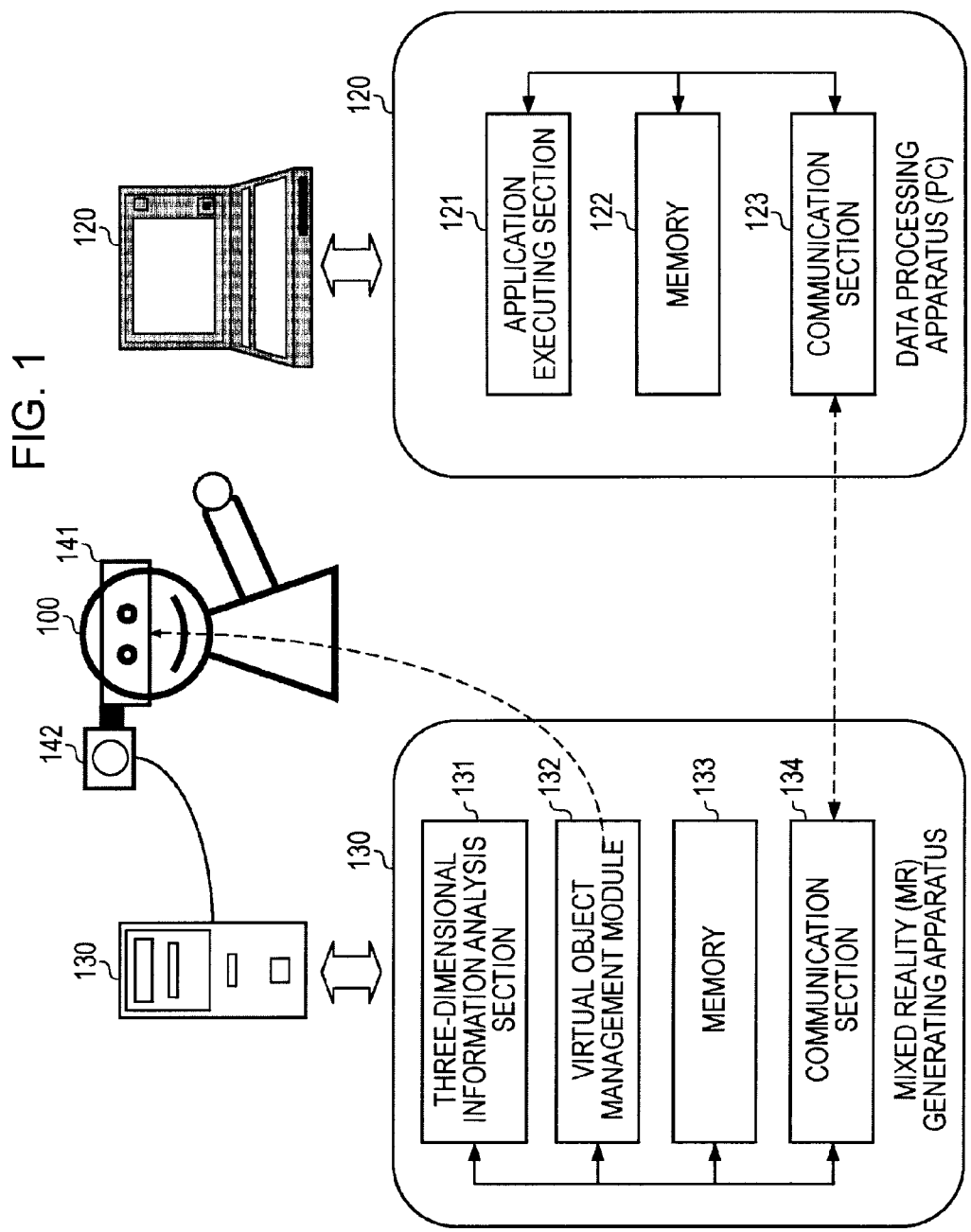
FIG. 1 is a diagram explaining about the configuration of an embodiment of an information processing apparatus according to the present invention.

A configuration example and a processing example of an information processing apparatus according to the present invention will be described with reference to FIG. 1 onwards. FIG. 1 is a diagram showing a configuration example of the information processing apparatus according to the present invention.

A user 100 performs various kinds of data processing by operating a PC (personal computer) 120. As shown in the drawing, the PC 120 has an application executing section 121, a memory 122, and a communication section 123. In the application executing section 121, an application program selected by the user is executed. For example, the application program is a document creation application or a rendering application. The memory 122 is formed by a RAM, a ROM, or the like, and is used as the storage area or work area for an application program. The memory 122 is also used as, for example, the storage area for non-displayed data which is no longer displayed on the display section (display) of the PC due to a scrolling process or the like which will be described later, and positional information of the non-displayed data, or the like. The communication section 123 performs communication processing with an inter Mixed Reality (MR) generating apparatus 130.

The user 100 is wearing eyeglasses 141 having a display that displays a virtual object. The eyeglasses 141 are equipped with a camera 142 that captures the surrounding environment. The eyeglasses 141 and the camera 142 are connected to the inter Mixed Reality (MR) generating apparatus 130. The user 100 does work while observing the image displayed on the display provided to the eyeglasses 141.

On the display of the eyeglasses 141, a real-world image that is an image captured by the camera 142 is displayed, and further, a virtual object generated by the Mixed Reality (MR) generating apparatus 130 is displayed together with the real-world image.

In the example in FIG. 1, the user 100 is operating the PC (personal computer) 120, and the camera 142 is capturing the PC (personal computer) 120 operated by the user 100. Accordingly, on the display of the eyeglasses 141, as a real-world image, for example, an image including the display of the PC (personal computer) 120 operated by the user 100 and various real objects in its surroundings is displayed. Further, a virtual object generated by the Mixed Reality (MR) generating apparatus 130 is displayed while being overlaid on this real-world image. As the user 100 moves, the orientation of the camera 142 is also changed. For example, when the user looks at his or her own hand, an image of the hand is displayed as a real-world object on the display of the eyeglasses 141, and a virtual object is displayed together with this real-world image.

Figure 2:
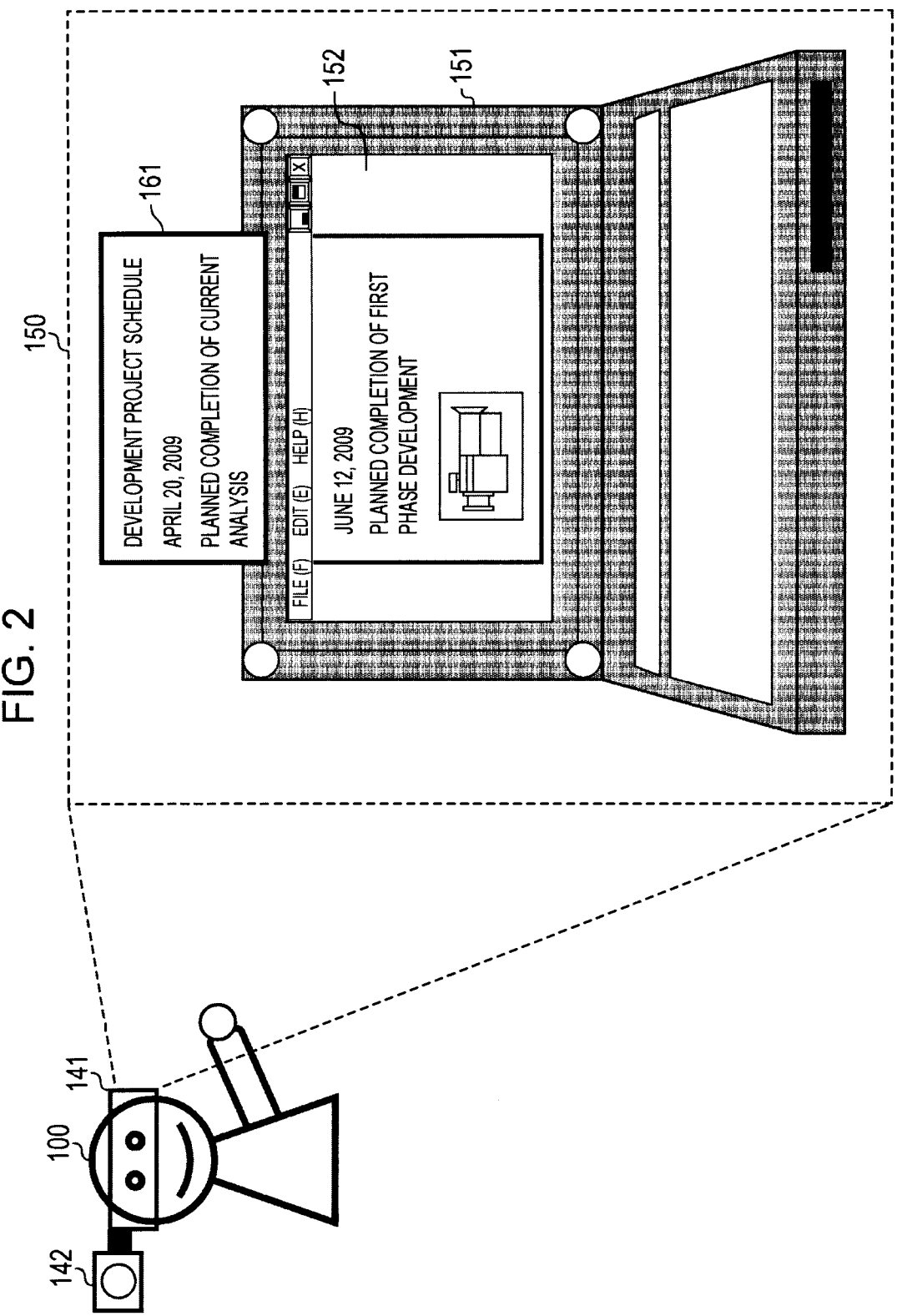
FIG. 2 is a diagram explaining about a display example of a virtual object executed by the information processing apparatus according to the present invention.

When the user 100 is performing processing while facing the screen of the PC 120, the camera 142 captures an image centered on the image of the screen of the PC 120. As a result, for example, a display's display image 200 as shown in FIG. 2 is displayed on the display of the eyeglasses 141 worn by the user 100. The display's display image 150 shown in FIG. 2 is a composite image of a real object and a virtual object.

Before going into description of FIG. 2, the configuration of the Mixed Reality (MR) generating apparatus 130 shown in FIG. 1 will be described. As shown in FIG. 1, the Mixed Reality (MR) generating apparatus 130 has a three-dimensional information analysis section 131, a virtual object management module 132, a memory 133, and a communication section 134.

The three-dimensional information analysis section 131 performs a process of taking input of an image captured by the camera 142 worn by the user, and analyzing the three-dimensional position of an object included in the captured image. This three-dimensional position analysis process is executed as a process that applies SLAM (simultaneous localization and mapping), for example. SLAM is a process which selects feature points from various real objects included in an image captured by a camera, and detects the positions of the selected feature points together with the position/attitude of the camera. It should be noted that SLAM is described in PTL 1 (Japanese Unexamined Patent Application Publication No. 2008-304268) and PTL 2 (Japanese Unexamined Patent Application Publication No. 2008-304269) described above. It should be noted that the basic processing of SLAM is described in the thesis [Andrew J. Davison, "Real-time simultaneous localization and mapping with a single camera", Proceedings of the 9th International Conference on Computer Vision, Ninth, (2003)].

The three-dimensional information analysis section 131 computes the three-dimensional position of a real object included an image captured by the camera 142 worn by the user by applying the above-mentioned SLAM, for example. It should be noted, however, that the three-dimensional information analysis section 131 may be set to obtain the three-dimensional position of an object included in a camera-captured image not only by the above-mentioned SLAM but also by other methods.

The virtual object management module 132 performs management of a virtual object to be displayed on the display of the eyeglasses 141 worn by the user. A virtual object is data stored in the memory 133. Specifically, for example, the display's display image 150 shown in FIG. 2 is displayed on the display of the eyeglasses 141 worn by the user. A PC image 151 included in the display's display image 150 is a real image (real image) captured by the camera 142. A virtual object 161 shown in FIG. 2 is displayed together with this real image (real object).

The user 100 shown in FIG. 1 can observe, for example, the composite image of a real object and a virtual object shown in FIG. 2 on the display of the eyeglasses 141. The PC image 151 shown in FIG. 2 is a real object captured by the camera 142. A PC display section 152 within the PC image 151 is also a real image. A part of the document being created by the user is displayed on the PC display section 152.

On the other hand, the virtual object 161 included in the display image 150 shown in FIG. 2 is not an object of the real world (real object). The virtual object 161 shown in FIG. 2 is a part of the sheet being processed by the user which is displayed within the PC display section 152 within the PC image 151.

While the user operates the PC 120 shown in FIG. 1 to set the size of the sheet, and enters characters or the like into the sheet of the set size, the sheet size is so large that the sheet extends off the display area of the PC 120, and the whole sheet is not displayed on the display of the PC. The virtual object 221 shown in FIG. 2 is non-displayed data that extends off the display area of the PC 120. Upon detecting occurrence of non-displayed data, the application executing section 121 of the PC 120 stores the non-displayed data, and its positional information into the memory 122 inside the PC 120.

The data stored in the memory 122 is transmitted to the Mixed Reality (MR) generating apparatus 130 by communication between the communication section 123 of the PC 120, and the communication section 134 of the Mixed Reality (MR) generating apparatus 130. The Mixed Reality (MR) generating apparatus 130 stores the data received from the PC 120 into the memory 133 inside the Mixed Reality (MR) generating apparatus 130.

The virtual object management module 132 of the Mixed Reality (MR) generating apparatus 130 performs a process of displaying the data stored in the memory 133 as a virtual object on the display of the eyeglasses 141 worn by the user. Specifically, for example, the virtual object management module 132 performs a process of determining the display position of a virtual object, and displaying the virtual object at the determined display position.

The example shown in FIG. 2 shows a case in which the virtual object 161 is displayed above the PC display section 152 of the PC image 151 that is displayed as a real object image. This display position is determined by the virtual object management module 132, by applying positional information that is stored into the memory 122 together with non-displayed data by the application executing section 121 of the PC 120. This positional information is also transmitted from the PC 120 to the Mixed Reality (MR) generating apparatus 130 by communication.

The virtual object 161 shown in FIG. 2 is non-displayed data that has gone off the area of the display section (display) of the PC 120 due to an operation made on the PC 120 by the user 100. This non-displayed data is transmitted to the Mixed Reality (MR) generating apparatus 130 by communication together with its positional information, and stored into the memory 133 of the Mixed Reality (MR) generating apparatus 130. With the data stored in the memory 133 as a virtual object, the virtual object management module 132 of the Mixed Reality (MR) generating apparatus 130 performs a process of determining the display position of the virtual object, and displays the virtual object on the display of the eyeglasses 141 worn by the user.

It should be noted that in the case of the apparatus shown in FIG. 1, the PC 120 and the Mixed Reality (MR) generating apparatus 130 are configured as two separate apparatuses, and data communication is performed between the two apparatuses. However, it is also possible to configure the PC 120 and the Mixed Reality (MR) generating apparatus 130 as a single apparatus, in which case the communication section in each of the apparatuses shown in FIG. 1 can be omitted. For example, it is also possible to perform processing within a single PC, by setting the three-dimensional information analysis section 131 and virtual object management module 132 of the Mixed Reality (MR) generating apparatus 130 in the PC 120.

That is, while in FIG. 1 the PC (personal computer) 120 and the inter Mixed Reality (MR) generating apparatus 130 are shown as two individual apparatuses, the information processing apparatus according to the present invention may be an apparatus configured solely by the inter Mixed Reality (MR) generating apparatus 130, or may be an apparatus configured by the two apparatuses made up of the inter Mixed Reality (MR) generating apparatus 130 and the PC 120. Alternatively, the information processing apparatus can be also configured by a single apparatus that combines the functions of the two apparatuses.

Figure 3:
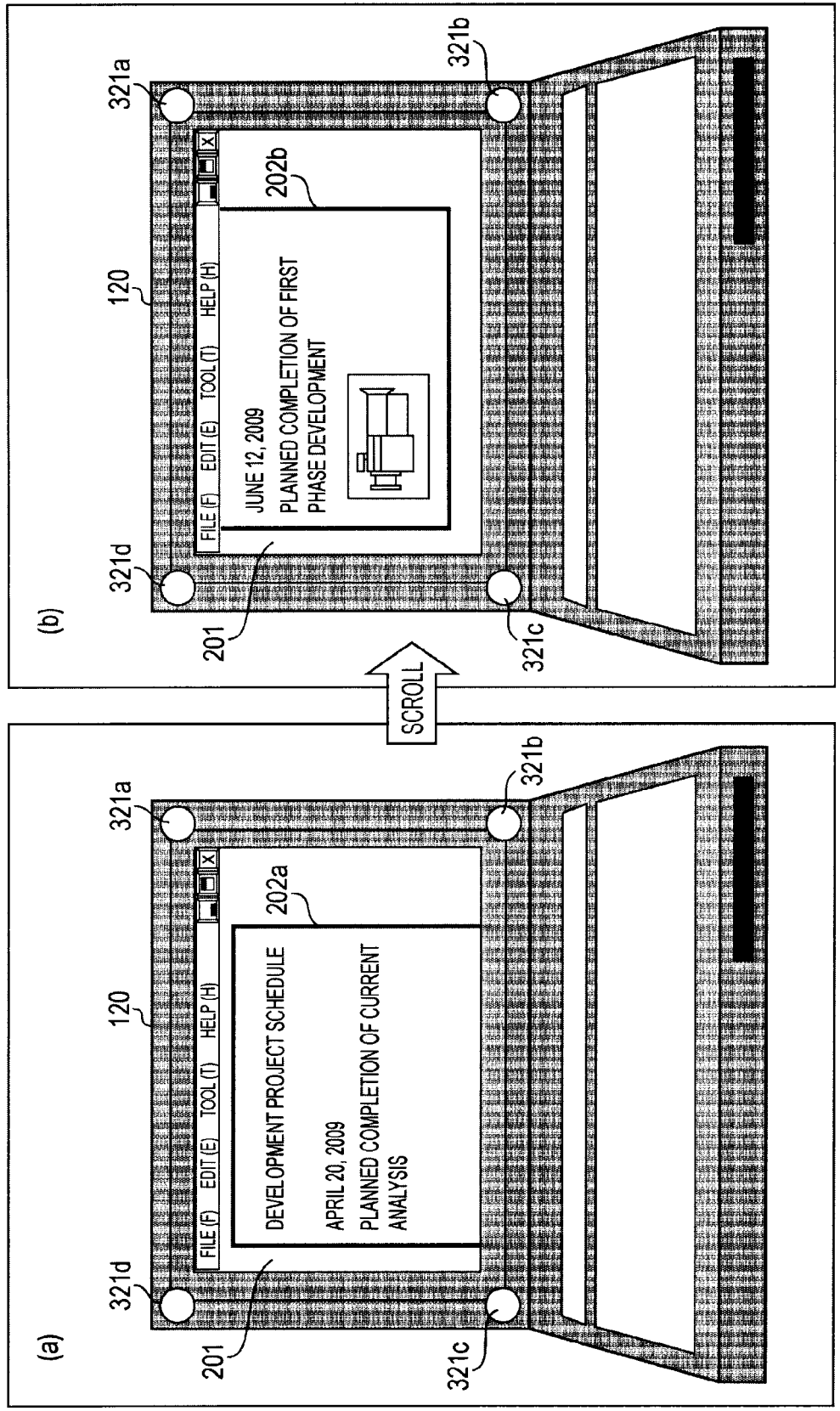
FIG. 3 is a diagram explaining about a processing example executed by the information processing apparatus according to the present invention.

With reference to FIG. 3 onwards, a description will be given of a specific processing example to which the configuration in FIG. 1 is applied. The user 100 is executing a document creation application in the application executing section 121 of the PC 120, and is creating a document with the document being created displayed on a display section 201 of the PC 120 as shown in FIG. 3(*a*). A sheet 202*a* of the document to be created is displayed on the display section 120 of the PC 120, and the user is entering characters or the like into the sheet 202*a*. On the display section 201, about half of the sheet 202*a* is displayed and the rest is hidden.

As the document creation proceeds, the user moves (scrolls) the sheet 202*a* up, and continues entry work while displaying the lower half. That is, as shown in FIG. 3(*b*), the lower side of a document sheet 202*b* to be created is displayed, and the user can enter characters or the like into the document sheet 202*b*. However, in the state shown in FIG. 3(*b*), only the lower half of the sheet 202*b* is displayed on the display section 201, and the rest of the area in the upper side lies off the area of the display section 201 and cannot be viewed by the user.

In the apparatus according to the present invention, the data that extends off the area of the display section 201, that is, non-displayed data is temporarily stored into the memory 122 of the PC 120 together with its positional information. Thereafter, this non-displayed data is transmitted to the Mixed Reality (MR) generating apparatus 130 via the communication section 123 together with the positional information. The Mixed Reality (MR) generating apparatus 130 stores the data received from the PC 120, that is, the non-displayed data and the positional information, into the memory 133 inside the Mixed Reality (MR) generating apparatus 130.

The three-dimensional information analysis section 131 of the Mixed Reality (MR) generating apparatus 130 takes input of an image captured by the camera 142 worn by the user 100, and computes the three-dimensional position of an object included in the captured image by applying the above-described SLAM, for example. For example, the three-dimensional information analysis section 131 selects markers 321*a* to 321*d* that are set at the four corners of the display of the PC shown in FIG. 3 as feature points, and computes the three-dimensional positions of these feature points.

It should be noted that while the example shown in FIG. 3 illustrates an example in which the markers 321*a* to 321*d* are set for identification of feature points, it is not necessarily required to set such markers. It is also possible to detect the shape of a real object, for example, a corner portion (corner) of a real object included in an image, select the detected corner portion (corner) as a feature point, and judge the three-dimensional position of the feature point. It should be noted that the corner portion (corner) detection process can be executed by a feature point extraction process using the existing Harris Corner Detector.

It should be noted that the three-dimensional information analysis section 131 may be configured to have the function of detecting a specific object from a captured image. Specifically, for example, if the PC's shape and feature information are registered in advance, and the screen area of the PC is discriminated by applying the registered information, it is possible to discriminate the screen area of the PC accurately and quickly from the captured image.

The virtual object management module 132 acquires the three-dimensional positional information of a real object included in a camera-captured image from the three-dimensional information analysis section 131. For example, the virtual object management module 132 acquires positional information of four points around the display section of the PC. Further the virtual object management module 132 acquires the non-displayed data stored in the memory 133, that is, non-displayed data that has gone off the PC screen during operation of the PC 120, and displays the acquired data as a virtual object on the display of the eyeglasses 141 of the user 100.

The display position of the virtual object is determined by the virtual object management module 132. The display position is determined by applying the positional information of the non-displayed data received from the PC 120, and the three-dimensional positional information of the real object within the camera-captured image acquired from the three-dimensional information analysis section 131.

The virtual object management module 132 sets the display position of the virtual object with respect to the display of the eyeglasses 141 of the user 100, in the direction of extension from the boundary of the display data of the PC display section displayed on the display of the eyeglasses 141 to the outside of the PC display section. That is, the virtual object management module 132 generates and displays a composite image in which the virtual object 161 is set at such a position as that in the display data 150 in FIG. 2. Through such a display process, the user is able to observe the whole sheet to be processed without feeling a sense of incongruity.

Figure 4:
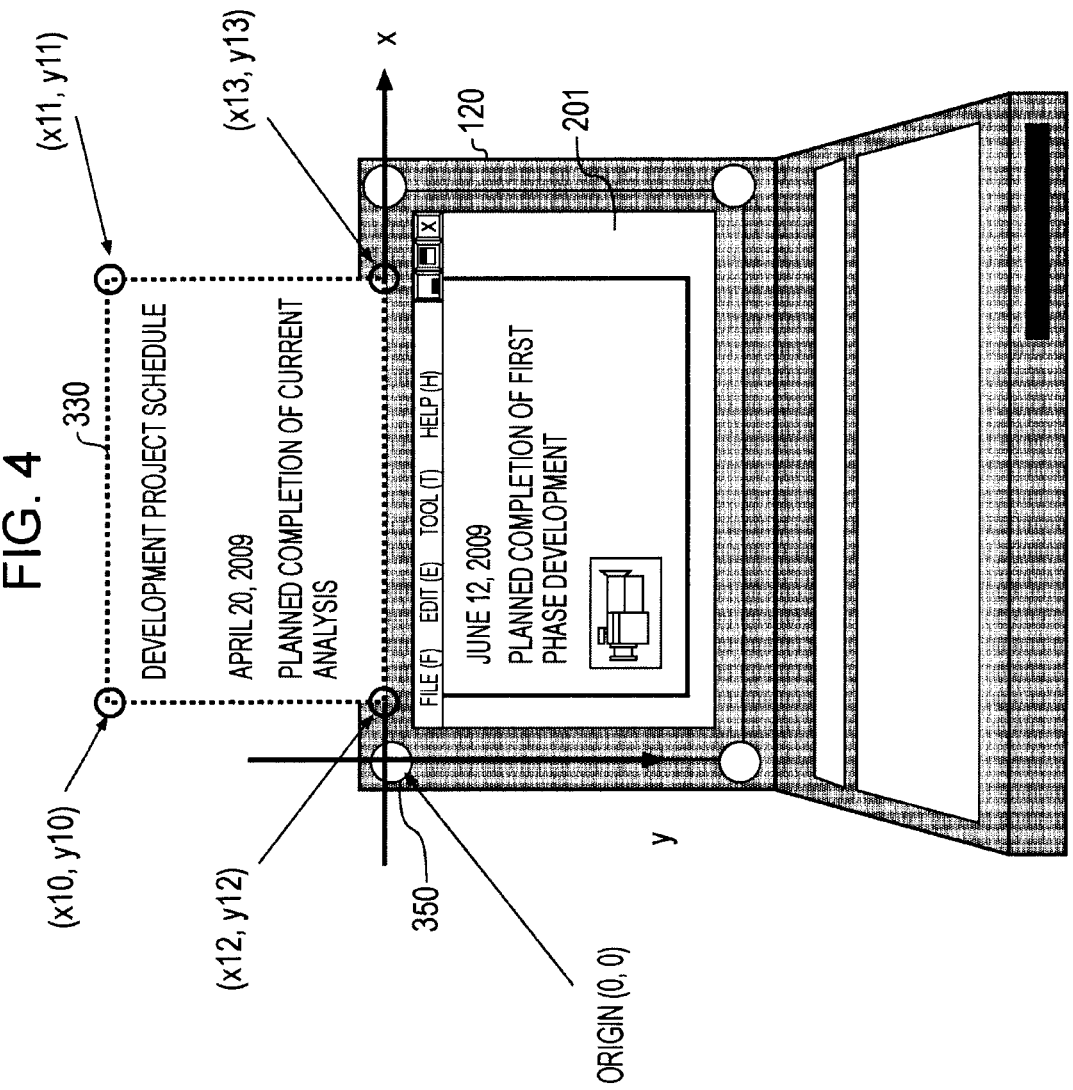
FIG. 4 is a diagram explaining about a specific processing example illustrating an example of processing executed by the information processing apparatus according to the present invention.

Referring to FIG. 4, a description will be given of the positional information of non-displayed data which is stored into the memory 122 by the application executing section 121 of the PC 120.

When non-displayed data that is no longer displayed on the screen occurs due to, for example, a scroll operation, the application executing section 121 of the PC 120 stores the non-displayed data into the memory 122. In the example in FIG. 4, the data contents of non-displayed data 330 indicated by a dotted box are stored into the memory 122 of the PC 120.

Further, the application executing section 121 of the PC 120 sets a specific position as an origin, with the plane defining the display section 201 of the PC taken as the x-y plane. In the example shown in the drawing, the point at the top left of the display section 201 is taken as an origin 350.

A plane parallel to the display section 201 is set by taking the horizontal direction as the x-axis and the vertical direction as the y-axis. This coordinate system is set as a coordinate system corresponding to the PC display section. The application executing section 121 obtains the position of the non-displayed data 330 in this coordinate system corresponding to the PC display section.

The coordinates of the four corners of the non-displayed data 330 shown in FIG. 4 are, as shown in the drawing, the coordinates of the following four points.

(x10, y10)
(x11, y11)
(x12, y12)
(x13, y13)

It should be noted that while in the example shown in FIG. 4 the positional information of non-displayed data is represented by the coordinates of the four corners of the non-displayed data, the required positional information varies with the shape of non-displayed data. The application executing section 121 executes a process of acquiring positional information according to the shape of non-displayed data which becomes necessary when displaying the non-displayed data as virtual data, and storing the positional information into the memory 122.

Figure 5:
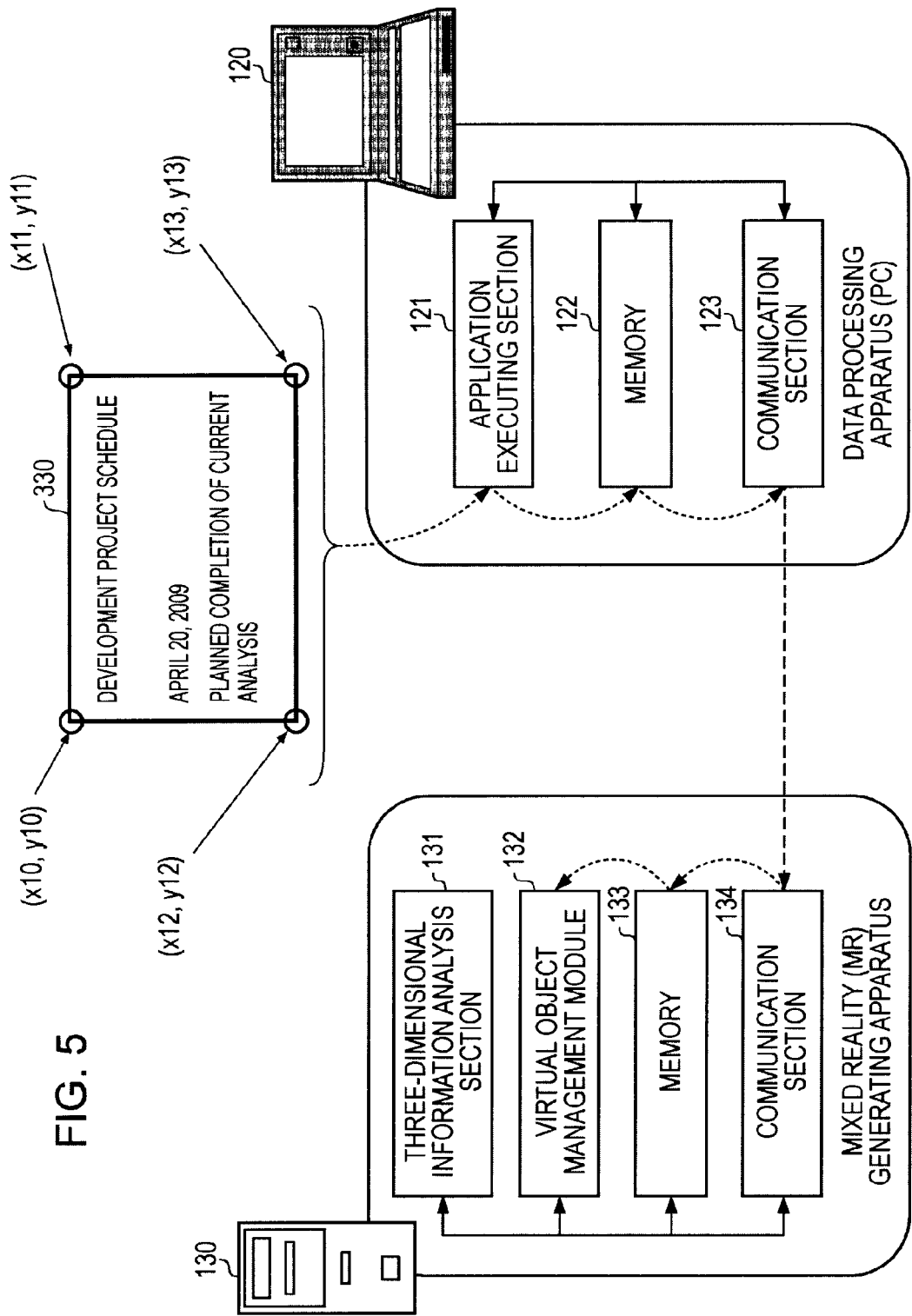
FIG. 5 is a diagram explaining about a specific processing example illustrating an example of processing executed by the information processing apparatus according to the present invention.

In the case of the non-displayed data 330 in a rectangular shape as shown in FIG. 4, the coordinate data of each of its four corners is acquired as the positional information of the non-displayed data. The subsequent processing will be described with reference to FIG. 5. As shown in FIG. 5, the application executing section 121 stores these four pieces of coordinate data as the positional information of the non-displayed data into the memory 122, together with the substance data of the non-displayed data.

The non-displayed data stored in the memory 122 on the PC 120 side and its positional information are transmitted to the Mixed Reality (MR) generating apparatus 130 via the communication section, and stored into the memory 133 of the Mixed Reality (MR) generating apparatus 130.

The virtual object management module 132 of the Mixed Reality (MR) generating apparatus 130 determines the display position of a virtual object (non-displayed data), by applying the positional information of the non-displayed data received from the PC 120 in this way, and the three-dimensional positional information of a real object within a camera-captured image acquired from the three-dimensional information analysis section 131. Through this process, the display data 150 previously described with reference to FIG. 2 is generated, and displayed on the display set in the eyeglasses 141 of the user 100.

Referring to the flowchart shown in FIG. 6, the processing sequence of the information processing apparatus according to the present invention will be described.

The processes in steps S101 to S103 of the flowchart shown in FIG. 3 are processes in the PC 120 shown in FIG. 1.

The processes in steps S104 to S107 are processes in the Mixed Reality (MR) generating apparatus 130 shown in FIG. 1.

First, when, in step S101, the application executing section 121 of the PC 120 detects occurrence of non-displayed data that extends off the area of the display section of the PC, in step S102, the application executing section 121 stores the substance data of the non-displayed data and its positional information into the memory 122 of the PC 120. This process is the process described with reference to FIG. 4 and FIG. 5. The positional information of the non-displayed data is, for example, the coordinate data of each of the four corners of the non-displayed data in the plane of the PC display section.

Next, in step S103, the non-displayed data and the positional information stored in the memory are transferred to the Mixed Reality (MR) generating apparatus 130 via the communication section.

The processes from step S104 onwards are performed as processes in the Mixed Reality (MR) generating apparatus 130.

First, in step S104, the Mixed Reality (MR) generating apparatus 130 stores the non-displayed data and its positional information transferred from the PC 120, into the memory 133 on the Mixed Reality (MR) generating apparatus 130 side.

Next, in step S105, the virtual object management module 132 of the Mixed Reality (MR) generating apparatus 130 acquires the data stored in the memory 133, that is, the non-displayed data and its positional information.

In step S106, the virtual object management module 132 performs a process of transforming the positional information of the non-displayed data acquired from the memory 133 into a camera coordinate system corresponding to the camera-captured image acquired from the three-dimensional information analysis section 131.

Figure 7:
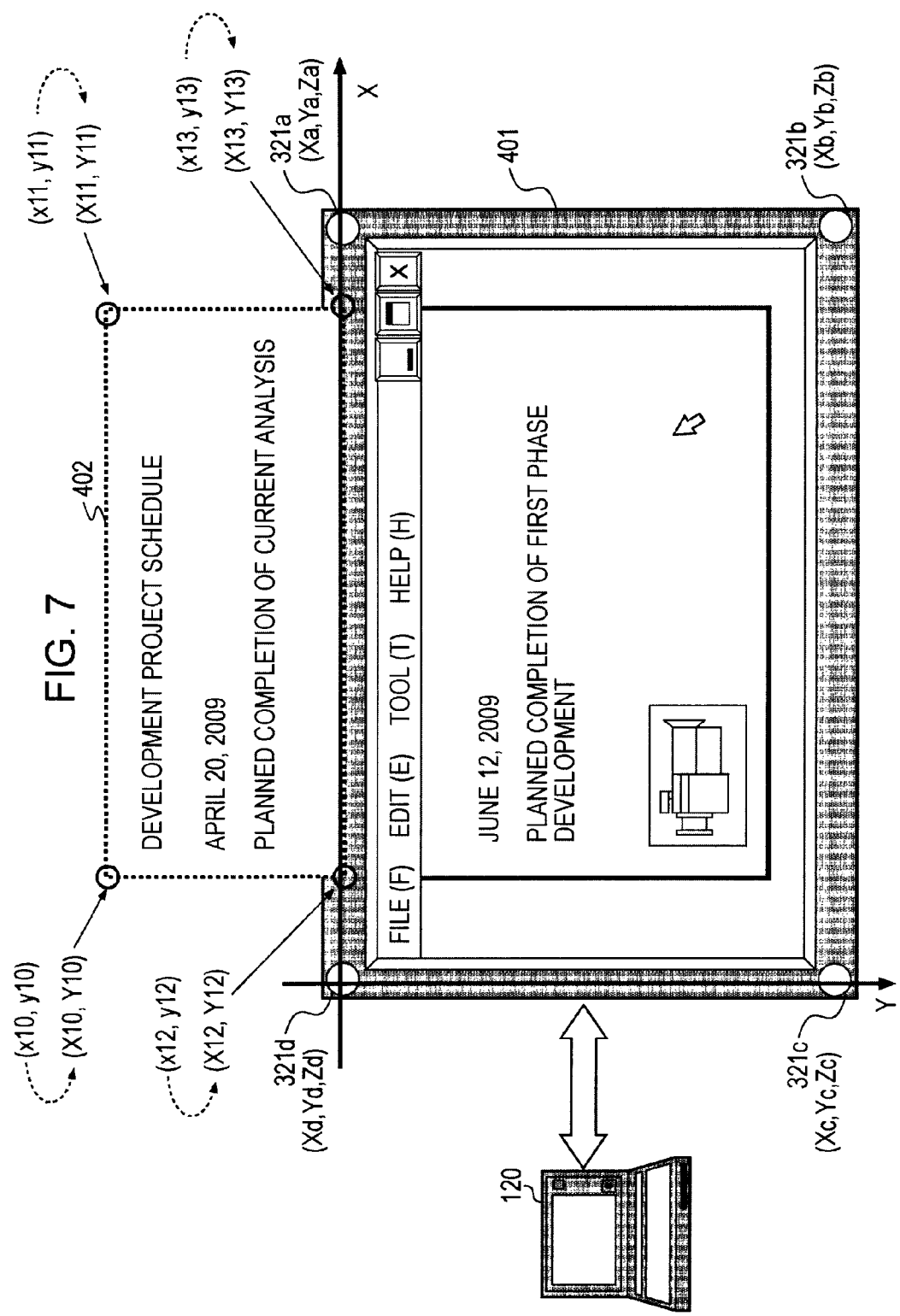
FIG. 7 is a diagram explaining about a specific processing example illustrating an example of processing executed by the information processing apparatus according to the present invention.

This process will be described with reference to FIG. 7. The three-dimensional information analysis section 131 has previously acquired the three-dimensional positional information of each of the markers 321a to 321d at the four corners of the display section of the PC 120 included in the camera-captured image. As shown in FIG. 7, the following pieces of positional information have been acquired.

Marker 321a=(Xa, Ya, Za)
Marker 321b=(Xb, Yb, Zb)
Marker 321c=(Xc, Yc, Zc)
Marker 321d=(Xd, Yd, Zd)

On the basis of this three-dimensional positional information, the virtual object management display module 132 computes the plane of the display section of the PC which is a real object in the camera coordinate system, and executes a coordinate transformation so as to set the non-displayed data 330 acquired from the PC 120 in the computed plane. The position of the sheet within the PC display section is also included in the camera-captured image, and the coordinate transformation is executed so as to set the non-displayed data 330 acquired from the PC 120 in accordance with the position of the sheet within the PC display section acquired from the camera. It should be noted that when the camera coordinate system is set in such a way that the plane of the PC display section in the camera-captured image is taken as the XY-plane and the direction perpendicular to the PC display section is taken as the Z-axis, the Z-coordinates of the four markers all become 0, thus enabling a setting that uses no Z-coordinate.

The coordinate transformation may be executed in such a way that the coordinates of the four corners of the non-displayed image previously received from the PC 120 are set in the XY-plane defined by the plane of the PC display section shown in FIG. 7. As shown in FIG. 7, the position coordinates of the four corners of the non-displayed data 330 in the coordinate system (x, y) corresponding to the PC display section are transformed as follows into coordinates in the camera coordinate system (X, Y).

(x10, y10)→(X10, Y10)
(x11, y11)→(X11, Y11)
(x12, y12)→(X12, Y12)
(x13, y13)→(X13, Y13)

The virtual object management module 132 sets these coordinates as the display position of a virtual object. In this way, in step S106 of the flowchart shown in FIG. 6, the virtual object management module 132 performs a process of transforming the positional information of the non-displayed data acquired from the memory 133 into the camera coordinate system corresponding to the camera-captured image acquired from the three-dimensional information analysis section 131.

In step S107, the virtual object management module 132 executes a process of displaying the non-displayed data acquired from the memory 133 as a virtual object, at the display position of a virtual object computed in step S106.

Figure 8:
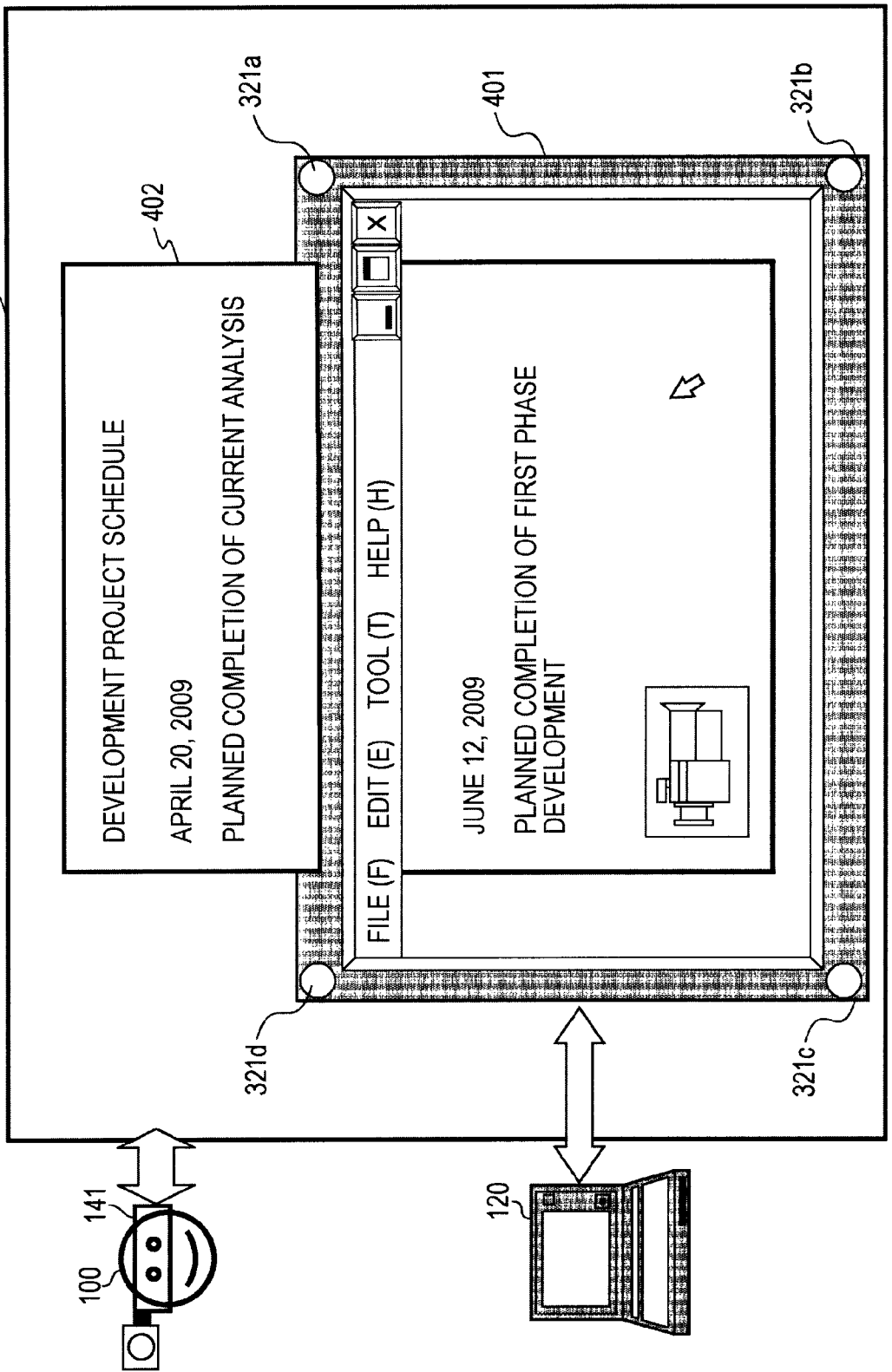
FIG. 8 is a diagram explaining about a specific processing example illustrating an example of processing executed by the information processing apparatus according to the present invention.

Through this process, display data 400 shown in FIG. 8 is displayed on the display of the eyeglasses 141 worn by the user 100. The display data 400 shown in FIG. 8 represents a composite image in which a PC 401 as a real object, and a virtual object 402 are displayed together. As shown in FIG. 8, the virtual object management module 132 sets the display position of the virtual object in the direction of extension from the boundary of the display data of the PC display section to the outside of the PC display section. Through such a display process, the user is able to observe the whole sheet to be processed without feeling a sense of incongruity.

Through this process, it is possible for the user 100 to always view also the non-displayed data that extends off the display section of the PC as a virtual object, together with the data displayed on the display section of the PC.

Figure 6:
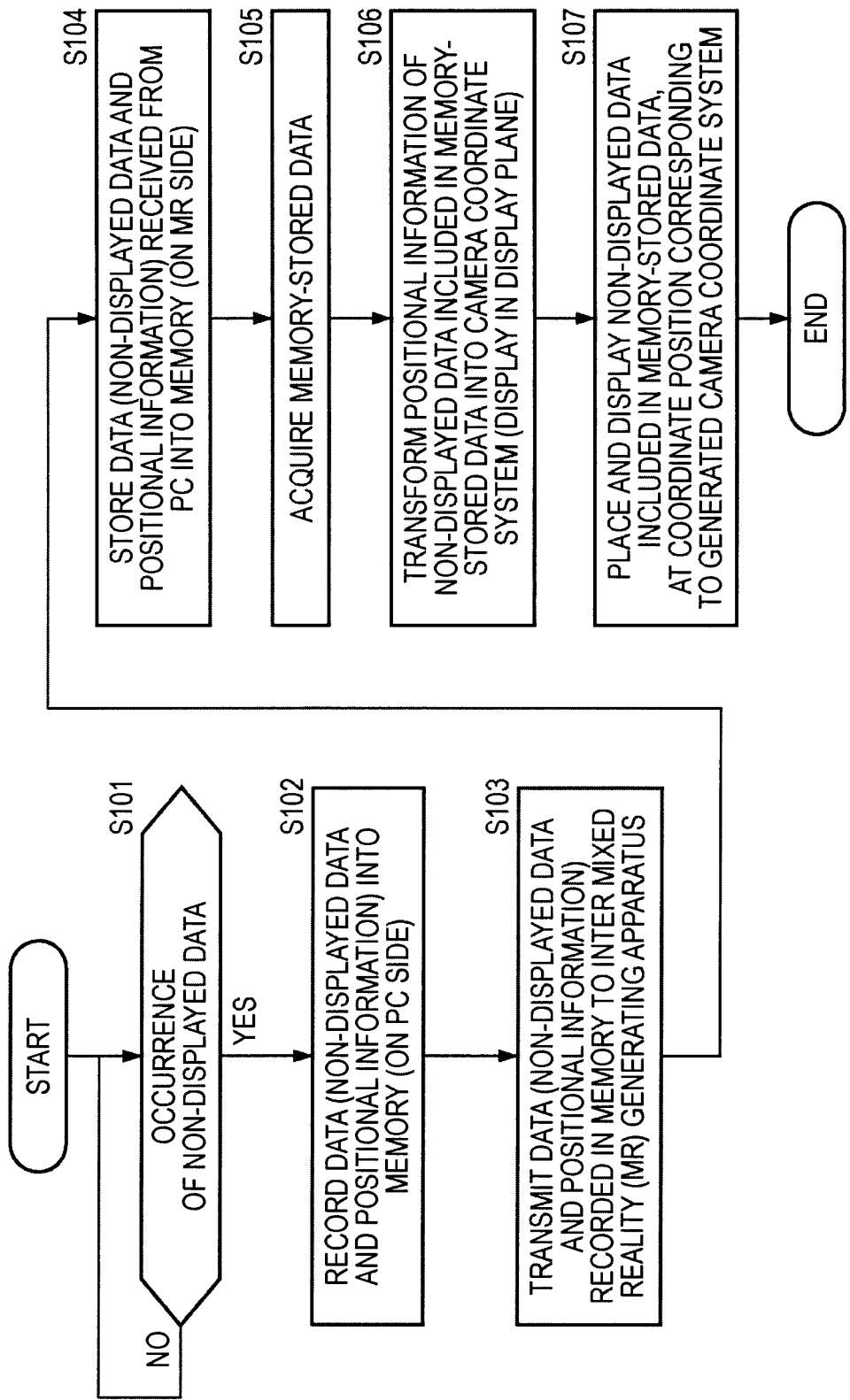
FIG. 6 is a diagram illustrating a flowchart explaining about a processing sequence executed by the information processing apparatus according to the present invention.

It should be noted that the processing described with reference to the flowchart shown in FIG. 6 is performed every time the user operates the PC 120 and the range of non-displayed data is changed due to a scrolling process or the like, for example. The application executing section 121 executes updating of data stored in the memory 122 every time a change is made to the area or contents of non-displayed data. The updated data is transmitted to the Mixed Reality (MR) generating apparatus 130. The Mixed Reality (MR) generating apparatus 130 executes a process of changing the manner of display of the virtual object on the basis of the updated data, as a real-time updating process.

[2. Display Process of a Virtual Object Adapted to the Shape of an Object in the Real World]

Next, as a second embodiment of the present invention, a description will be given of a display process of a virtual object adapted to the shape of an object in the real world.

Figure 9:
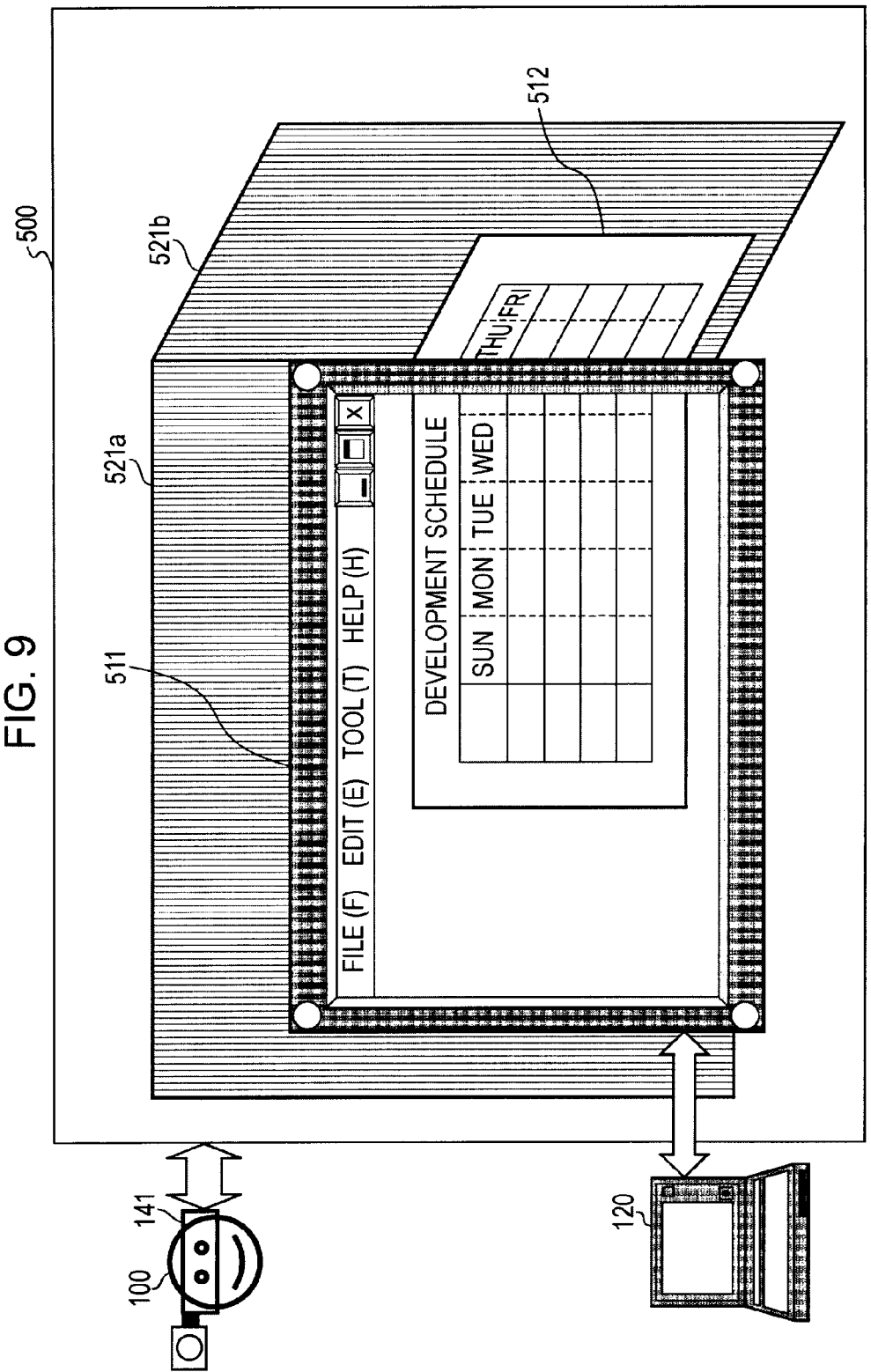
FIG. 9 is a diagram explaining about a specific processing example illustrating an example of processing executed by the information processing apparatus according to the present invention.

In the embodiment described above, the display of a virtual object is performed by enlarging the plane corresponding to the screen of the PC. However, for example, as shown in FIG. 9, there are cases in which the plane of the display section of the PC is obstructed by a wall 521 in the real world. If the display process of a virtual object described above is executed in such cases, the virtual object is displayed penetrating the wall, with the result that the user observes data that causes a sense of incongruity.

In the following, display data 500 as shown in FIG. 9 is generated and presented to the user. That is, a virtual object 512 is displayed in accordance with the shape of a real object (for example, walls 521a and 521b shown in FIG. 9) in the real world.

This embodiment is an embodiment that makes it possible to display the virtual object 512 along an object of the real world. For example, as shown in FIG. 9, it is possible to display the virtual object 512 along the surface of the wall 521b that is a real object. It should be noted that in this embodiment as well, the configuration described with reference to FIG. 1 is applied as the apparatus configuration.

Figure 10:
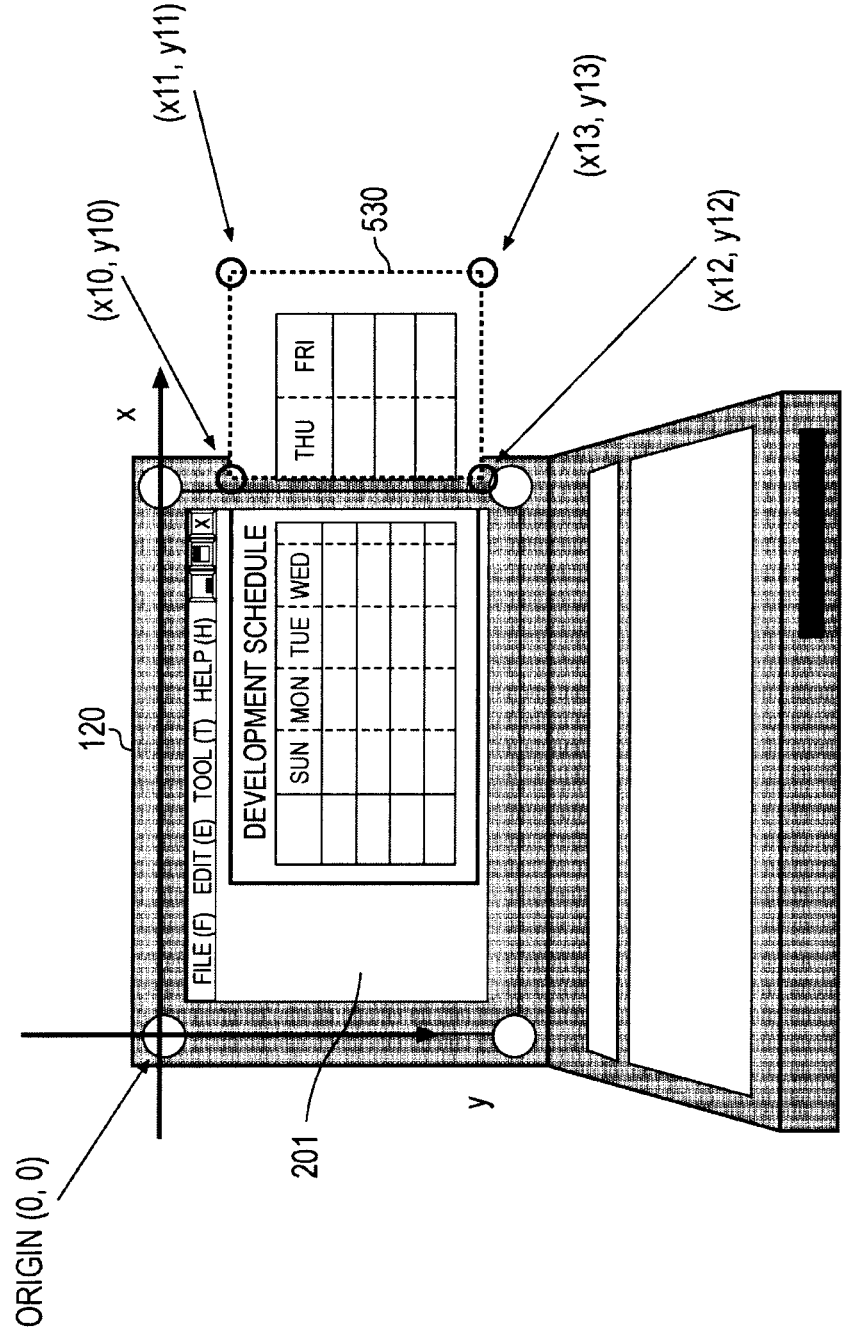
FIG. 10 is a diagram explaining about a specific processing example illustrating an example of processing executed by the information processing apparatus according to the present invention.

Referring to FIG. 10, a description will be given of the positional information of non-displayed data which is stored into the memory 122 by the application executing section 121 of the PC 120 in this embodiment. When non-displayed data that is no longer displayed on the screen occurs due to, for example, a scroll operation, the application executing section 121 of the PC 120 stores the non-displayed data into the memory 122. In the example in FIG. 10, the data contents of non-displayed data 530 indicated by a dotted box are stored into the memory 122 of the PC 120.

Further, as in the embodiment previously described, the application executing section 121 of the PC 120 sets a plane parallel to the display section 201, by taking the point at the top left of the display section 201 as an origin, the horizontal direction as the x-axis, and the vertical direction as the y-axis. This coordinate system is set as a coordinate system corresponding to the PC display section. The application executing section 121 obtains the position of the non-displayed data 530 in this coordinate system corresponding to the PC display section.

The coordinates of the four corners of the non-displayed data 530 shown in FIG. 10 are, as shown in the drawing, the coordinates of the following four points.

(x10, y10)
(x11, y11)
(x12, y12)
(x13, y13)

The non-displayed data stored in the memory 122 on the PC 120 side and its positional information are transmitted to the Mixed Reality (MR) generating apparatus 130 via the communication section, and stored into the memory 133 of the Mixed Reality (MR) generating apparatus 130.

The virtual object management module 132 of the Mixed Reality (MR) generating apparatus 130 determines the display position of a virtual object (non-displayed data), by applying the positional information of the non-displayed data received from the PC 120 in this way, and the three-dimensional positional information of a real object within a camera-captured image acquired from the three-dimensional information analysis section 131.

In this embodiment, the display data 500 described with reference to FIG. 9 is generated. That is, the display position of the virtual object is determined in such a way that the virtual object is displayed along the surface of the real object.

Referring to the flowchart shown in FIG. 11, the processing sequence of the information processing apparatus according to the present invention will be described.

Figure 11:
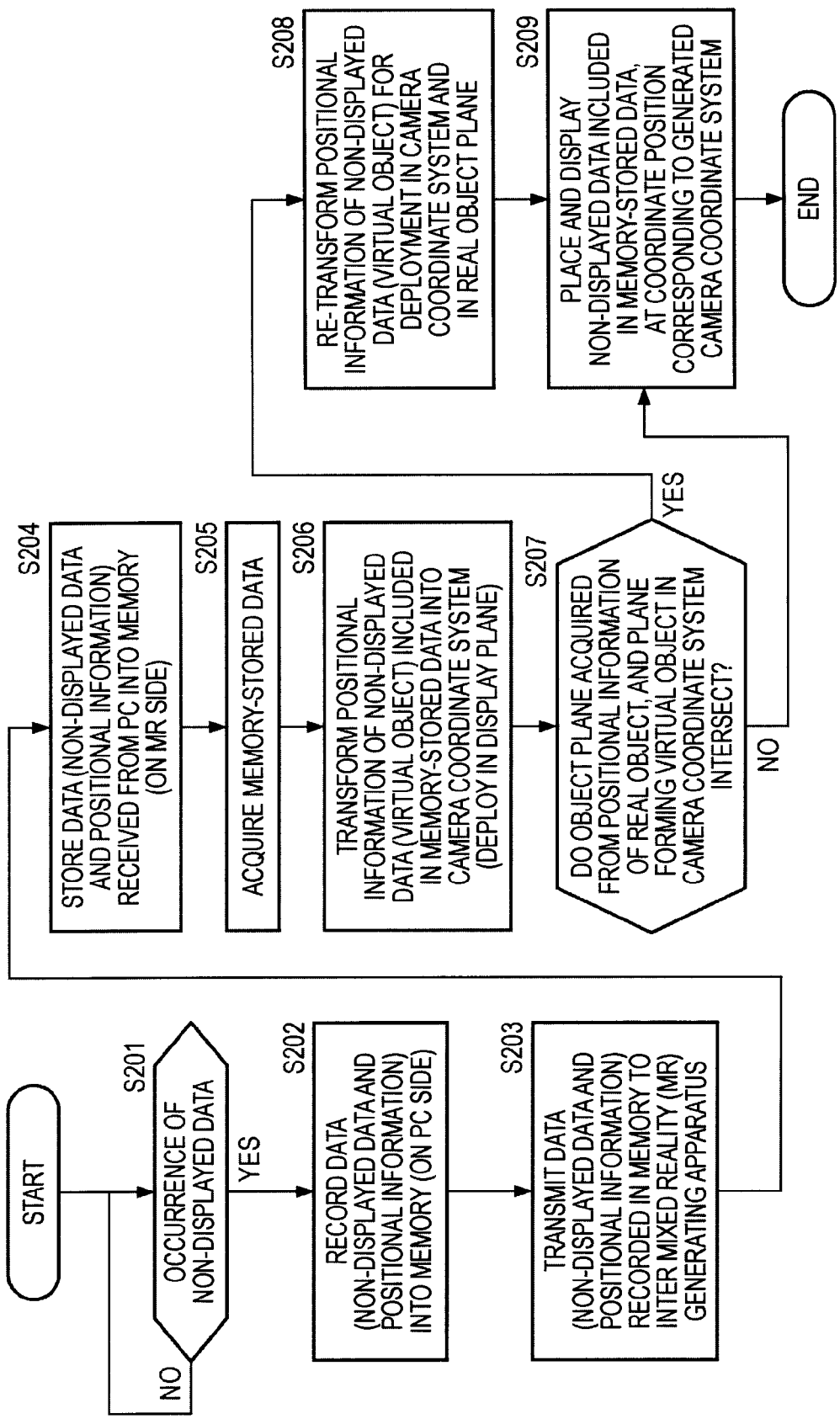
FIG. 11 is a diagram illustrating a flowchart explaining about a processing sequence executed by the information processing apparatus according to the present invention.

The processes in steps S201 to S203 of the flowchart shown in FIG. 11 are processes in the PC 120 shown in FIG. 1.

The processes in steps S204 to S209 are processes in the Mixed Reality (MR) generating apparatus 130 shown in FIG. 1.

First, when, in step S201, the application executing section 121 of the PC 120 detects occurrence of non-displayed data that extends off the area of the display section of the PC, in step S202, the application executing section 121 stores the substance data of the non-displayed data and its positional information into the memory 122 of the PC 120. This process is the process described with reference to FIG. 10. The positional information of the non-displayed data is, for example, the coordinate data of each of the four corners of the non-displayed data in the plane of the PC display section.

Next, in step S203, the non-displayed data and the positional information stored in the memory are transferred to the Mixed Reality (MR) generating apparatus 130 via the communication section.

The processes from step S204 onwards are performed as processes in the Mixed Reality (MR) generating apparatus 130.

First, in step S204, the Mixed Reality (MR) generating apparatus 130 stores the non-displayed data and its positional information transferred from the PC 120, into the memory 133 on the Mixed Reality (MR) generating apparatus 130 side.

Next, in step S205, the virtual object management module 132 of the Mixed Reality (MR) generating apparatus 130 acquires the data stored in the memory 133, that is, the non-displayed data and its positional information.

In step S206, the virtual object management module 132 performs a process of transforming the positional information of the non-displayed data acquired from the memory 133 into a camera coordinate system corresponding to the camera-captured image acquired from the three-dimensional information analysis section 131.

This process is the same process as the process in step S106 of the flowchart shown in FIG. 6 previously described as a process according to the first embodiment.

That is, the three-dimensional information analysis section 131 acquires the three-dimensional positional information of each of the markers 321a to 321d at the four corners of the display section of the PC 120 included in the camera-captured image. As previously described with reference to FIG. 7, the following pieces of positional information are acquired.

Marker $321a = (Xa, Ya, Za)$
Marker $321b = (Xb, Yb, Zb)$
Marker $321c = (Xc, Yc, Zc)$
Marker $321d = (Xd, Yd, Zd)$ On the basis of this three-dimensional positional information, the virtual object management display module 132 computes the plane of the display section of the PC which is a real object in the camera coordinate system, and executes a coordinate transformation so as to set the non-displayed data 530 acquired from the PC 120 in the computed plane. The position of the sheet within the PC display section is also included in the camera-captured image, and the coordinate transformation is executed so as to set the non-displayed data 330 acquired from the PC 120 in accordance with the position of the sheet within the PC display section acquired from the camera.

In this coordinate transformation, the coordinate transformation is executed in such a way that the coordinates of the four corners of the non-displayed image previously received from the PC 120 are set in the XY-plane defined by the plane of the PC display section. The position coordinates of the four corners of the non-displayed data 330 in the coordinate system (x, y, z) corresponding to the PC display section are transformed as follows into coordinates in the camera coordinate system (X, Y, Z).

(x10, y10, z10)→(X10, Y10, Z10)
(x11, y11, z11)→(X11, Y11, Z11)
(x12, y12, z12)→(X12, Y12, Z12)
(x13, y13, z14)→(X13, Y13, Z14)

It should be noted that in this embodiment, unlike in the previous embodiment, processing is performed by also taking the Z-direction into consideration.

In step S207, the virtual object management display module 132 judges whether or not the plane obtained by the four coordinates in the camera coordinate system indicating the display position of the virtual object obtained by the transformation process in step S206 intersects the plane of the real object. The plane of the real object, acquired from the three-dimensional positional information of the real object acquired by the three-dimensional information analysis section 131.

If the display plane of the virtual object does not intersect the plane of the real object, the judgment in step S207 becomes No. In this case, the processing proceeds to step S209, and the virtual object is displayed by applying the transformed coordinates computed in step S206. This process is the same process as in the first embodiment previously described, in which the virtual object is displayed in a plane obtained by enlarging the plane of the PC display section.

On the other hand, if it is judged in step S207 that the plane obtained by the four coordinates in the camera coordinate system indicating the display position of the virtual object obtained by the transformation process in step S206 intersects the plane of the real object, the processing proceeds to step S208.

That is, this corresponds to the case of the state as shown in FIG. 9. In such a case, in step S208, a process of re-transforming the coordinates indicating the display position of the virtual object is performed. That is, a process of re-transforming the four coordinates indicating the display position of the virtual object computed in step S206 is performed.

This transformation process is performed as a process of transforming the four coordinates indicating the display position of the virtual object in such a way that the coordinates are set in the plane forming the real object. This process will be described with reference to FIG. 12.

Figure 12:
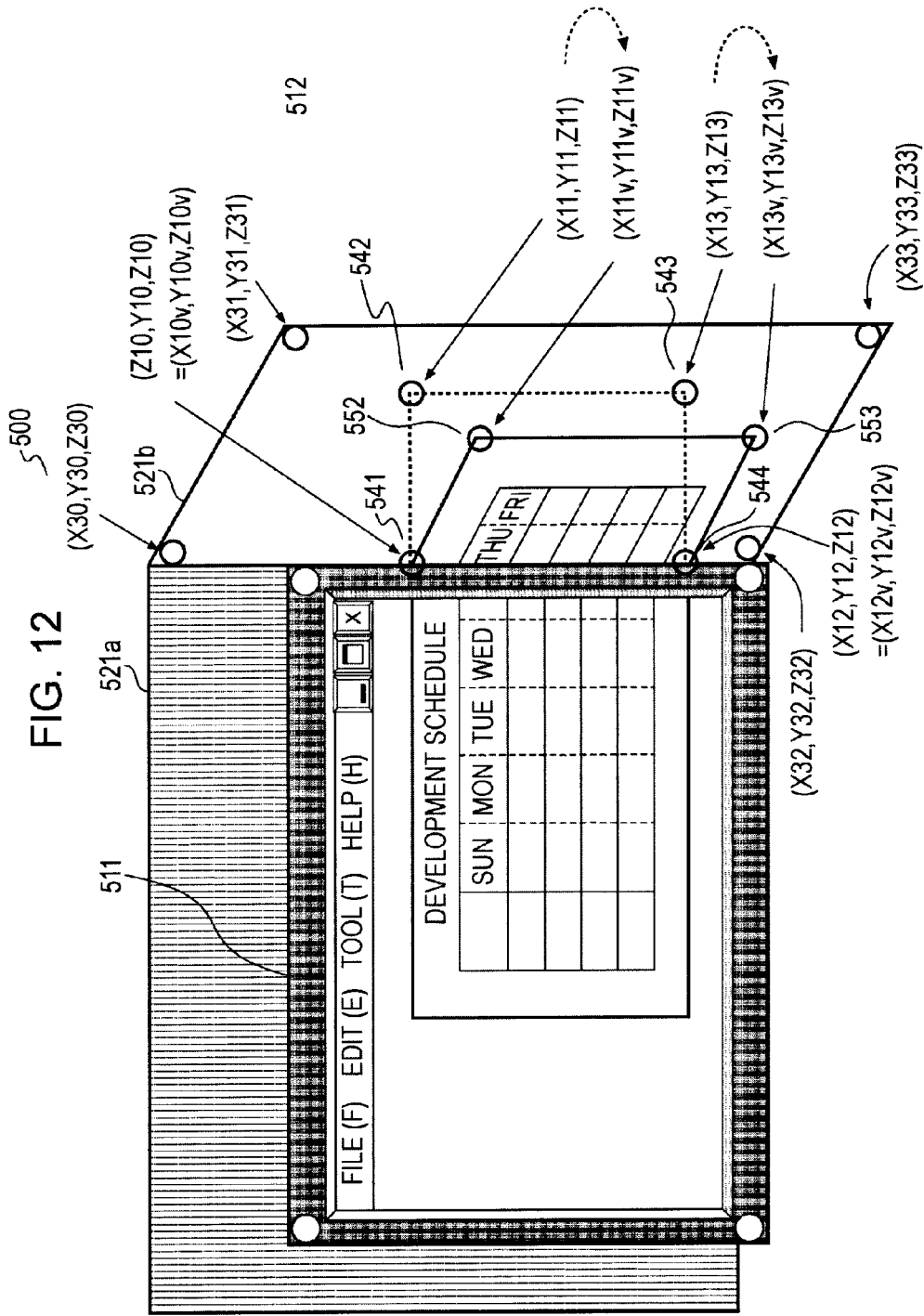
FIG. 12 is a diagram explaining about a specific processing example illustrating an example of processing executed by the information processing apparatus according to the present invention.

In step S206, the coordinates of the four corners indicating the display position of the virtual object computed are points 541 to 544 shown in FIG. 12. As shown in the drawing, these coordinates are the following coordinates.

Point 541=(X10, Y10, Z10)
Point 542=(X11, Y11, Z11)
Point 543=(X13, Y13, Z13)
Point 544=(X12, Y12, Z12)

However, the plane presented by the four points intersects the plane of the wall 521 that is a real object. It should be noted that the plane forming the wall 521 as a real object is obtained through analysis by the three-dimensional information analysis section 131. For example, the points at the four corners of the wall shown in FIG. 12 are detected as feature points, and the plane formed by these four feature points is judged as the plane forming the wall 521 that is a real object.

In the example shown in FIG. 12, the plane of the wall 521$b$ is defined by the following four coordinates representing the coordinates of the four corners.

(X30, Y30, Z30)
(X31, Y31, Z31)
(X32, Y32, Z32)
(X33, Y33, Z33)

The virtual object management module 132 transforms the coordinates of the four points 541 to 544 of the virtual object so as to deploy the four points 541 to 544 of the virtual object shown in FIG. 12 in the plane forming the wall 521$b$ mentioned above. As a result of this, the coordinate transformation as shown in the drawing is obtained.

Point 541 (X10, Y10, Z10)→After transformation (X10v, Y10v, Z10v) (=point 541)
Point 542 (X11, Y11, Z11)→After transformation (X11v, Y11v, Z11v) (=point 552)
Point 543 (X13, Y13, Z13)→After transformation (X13v, Y13v, Z13v) (=point 553)
Point 544 (X12, Y12, Z12)→After transformation (X12v, Y12v, Z12v) (=point 542)

Four transformed coordinates are computed in this way. It should be noted that as appreciated from the drawing, the point 541 and the point 542 remain unchanged in coordinate position before and after the transformation.

As for the point 542 and the point 543 located at positions penetrating the wall 521$b$, a process of transforming these points into positions in the plane of the wall 521$b$ is performed.

After such a coordinate transformation process in step S208, the processing proceeds to step S209. In step S209, by taking the non-displayed data acquired from the memory 133 as a virtual object, the virtual object management module 132 executes a process of displaying the virtual object at the display position of the virtual object computed in step S208.

Through this process, for example, the display data 500 shown in FIG. 13 is displayed on the display of the eyeglasses 141 worn by the user 100. The display data 500 shown in FIG. 13 represents a composite image in which a PC 511 as a real object, and the virtual object 512 are displayed together.

It is possible for the user 100 to always view also the non-displayed data that extends off the display section of the PC as a virtual object, together with the display data of the display section of the PC.

It should be noted that the processing described with reference to the flowchart shown in FIG. 11 is performed every time the user operates the PC 120 and the range of non-displayed data is changed due to a scrolling process or the like, for example. The application executing section 121 executes updating of data stored in the memory 122 every time a change is made to the area or contents of non-displayed data. The updated data is transmitted to the Mixed Reality (MR) generating apparatus 130. The Mixed Reality (MR) generating apparatus 130 executes a process of changing the manner of display of the virtual object on the basis of the updated data, as a real-time updating process.

[3. Processing Example Using Another Display Apparatus]

In the embodiments described above, the description is directed to the configuration that enables the user to observe data that is no longer displayed on the display screen of a PC as a virtual object when operating the PC.

However, the processing to which the present invention is applied, that is, the virtual object display process can be used not only for data to be processed on a PC but also in various kinds of apparatus having a display section. For example, also in the case of observing the portion that lies outside the display area of data to be displayed on the display section of a portable telephone 600 as shown in FIG. 14, by performing the virtual object display process described above, display data 700 as shown in FIG. 14 can be displayed on the display of the eyeglasses 141 worn by the user 100.

A portable telephone image 701 as a real object owned by the user, and a virtual object 702 as map data are displayed as the display data 700, allowing the user to view wide map information in the portion outside the display section of the portable telephone.

According to the configuration of the present invention, for example, since information that has been scrolled off the screen of the display section of a PC or the like is displayed in the real world as it is, there is no need to operate a scroll bar to display the information, making it possible to always view data over a wide area. Also, since the virtual object is displayed outside the screen in a manner contiguous to the screen the user is operating on, it is possible to always view information over a wide area, without causing a sense of visual incongruity.

In the foregoing, the present invention has been described in detail with reference to specific embodiments. However, it is obvious that a person skilled in the art can make various modifications to and substitutions for the embodiments without departing from the scope of the present invention. That is, the present invention has been disclosed by way of examples, and should not be construed restrictively. The scope of the present invention should be determined with reference to the appended claims.

Also, the series of processes described in the specification can be executed by hardware, software, or a composite configuration of both. If the processes are to be executed by software, the processes can be executed by installing a program recording the processing sequence into a memory in a computer embedded in dedicated hardware, or by installing the program into a general purpose computer capable of executing various processes. For example, the program can be pre-recorded on a recording medium. Other than being installed into a computer from a recording medium, the program can be received via a network such as a LAN (Local Area Network) or the Internet, and installed into a built-in recording medium such as a hard disk.

It should be noted that the various processes described in the specification may be executed not only time sequentially in the order as described but may be executed in parallel or independently depending on the throughput of the apparatus executing the processes. Also, the term system as used in this specification refers to a logical aggregation of a plurality of apparatuses, and is not limited to one in which the constituent apparatuses are located within the same casing.

INDUSTRIAL APPLICABILITY

As has been described in the foregoing, according to the configuration of an embodiment of the present invention, a configuration is realized with which, in various kinds of display apparatus such as a PC and a portable telephone having a display section, non-displayed data that extends off the area of the display section is displayed as a virtual object at a position contiguous to the display data of the display section. This configuration allows the user to always observe and view not only data displayed on a limited display area of a PC or the like but also data that has gone off the display section, thereby enhancing data processing efficiency.

REFERENCE SIGNS LIST 100 user
120 PC (personal computer)
121 application executing section
122 memory
123 communication section
130 Mixed Reality (MR) generating apparatus
131 three-dimensional information analysis section
132 virtual object management module
133 memory
134 communication section
141 eyeglasses
142 camera
150 display's display image
151 PC image
152 PC display section
161 virtual object
201 display section
202 sheet
321a to 321d marker
330 non-displayed data
350 origin
401 PC
402 virtual object
500 display data
511 PC
512 virtual object
521 wall
530 non-displayed data
600 portable telephone
700 display data
701 portable telephone image (real object)
702 virtual object

The invention claimed is:

1. An information processing apparatus comprising:
at least one processor;
a physical display unit comprising a two dimensional physical display screen; and
a virtual display unit comprising a three dimensional virtual display screen, wherein the three dimensional virtual display screen is configured to at least one of extend or expand a viewing area of a content window displayed on the two dimensional physical display screen onto the three dimensional virtual display screen using the at least one processor, wherein the displayed content window spans between the two dimensional physical display screen and the three dimensional virtual display screen;

a three-dimensional information analysis section configured to analyze a three-dimensional position of a real object including the physical display section using the at least one processor;
a virtual object management section that takes input of the virtually displayed data and the positional information of the virtually displayed data which are stored in the memory using the at least one processor;
wherein the virtual object management section transforms coordinate data, which is the positional information of the virtually displayed data stored in the memory, into a camera coordinate system serving as an indicator of a display position in a display image of the second display section, and determines the display position of the virtual object by applying the transformed coordinate data using the at least one processor,
wherein the virtual object management section judges whether or not an intersection occurs between the display position of the virtual object transformed into the camera coordinate system, and a plane forming the real object included in the camera-captured image, and if the intersection occurs, executes a coordinate re-transformation process so as to position the transformed coordinate data in the plane forming the real object, and determines the display position of the virtual object by applying the re-transformed coordinate data using the at least one processor.

2. The information processing apparatus according to claim 1, wherein:
the information processing apparatus includes
a first apparatus having the application executing section, and
a second apparatus having the three-dimensional information analysis section, and the virtual object management section; and
data stored into a first memory in the first apparatus by the application executing section is transferred to the second apparatus via a communication section, and in the second apparatus, the three-dimensional information analysis section and the virtual object management section perform processing using received data using the at least one processor.

3. An information processing method which is executed in an information processing apparatus, comprising:
an application executing step of an application executing section storing virtual displayed data and positional information of the virtual displayed data into a memory in data processing using a first display section, the virtual displayed data being contiguous to physically display data of the first display section, wherein a physical display unit comprising a two dimensional physical display screen and a virtual display unit comprising a three dimensional virtual display screen, wherein the three dimensional virtual display screen is configured to at least one of extend or expand a viewing area of a content window displayed on the two dimensional physical display screen onto the three dimensional virtual display screen, wherein the displayed content window spans between the two dimensional physical display screen and the three dimensional virtual display screen;
a three-dimensional information analysis step of a three-dimensional information analysis section analyzing a three-dimensional position of a real object including the first display section included in a camera-captured image; and
a virtual object management step of a virtual object management section taking input of the virtually displayed data and the positional information of the physically displayed data which are stored in the memory, and three-dimensional positional information of the first display section analyzed by the three-dimensional information analysis section, generating a composite image formed by the real object included in the camera-captured image and a virtual object formed by the virtually displayed data, and displaying the composite image on a second display section, wherein the virtual object management step has a step of setting a display position of the virtual object on the second display section, at a position located in a direction of extension from a boundary of the display data of the first display section displayed on the second display section to an outside of the first display section, wherein the virtual object management step transforms coordinate data, which is the positional information of the virtually displayed data stored in the memory, into a camera coordinate system serving as an indicator of a display position in a display image of the second display section, and determines the display position of the virtual object by applying the transformed coordinate data, and wherein the virtual object management step judges whether or not an intersection occurs between the display position of the virtual object transformed into the camera coordinate system, and a plane forming the real object included in the camera-captured image, and if the intersection occurs, executes a coordinate re-transformation process so as to position the transformed coordinate data in the plane forming the real object, and determines the display position of the virtual object by applying the re-transformed coordinate data.

4. A non-transitory computer-readable medium having embodied thereon a program, which when executed by a computer, causes information processing to be executed in an information processing apparatus, comprising:

an application executing step of causing an application executing section to store virtually displayed data and positional information of the virtually displayed data into a memory in data processing using a first display section, the virtually displayed data being contiguous to display data of the first display section;

a three-dimensional information analysis step of causing a three-dimensional information analysis section to analyze a three-dimensional position of a real object including the first display section included in a camera-captured image; and a virtual object management step of causing a virtual object management section to take input of the virtually displayed data and the positional information of the virtually displayed data which are stored in the memory, and three-dimensional positional information of the first display section analyzed by the three-dimensional information analysis section, generate a composite image formed by the real object included in the camera-captured image and a virtual object formed by the virtually displayed data, and display the composite image on a second display section, wherein a physical display unit comprising a two dimensional physical display screen and a virtual display unit comprising a three dimensional virtual display screen, wherein the three dimensional virtually displayed data is configured to at least one of extend or expand a viewing area of a content window displayed on the two dimensional physical display screen onto the three dimensional virtual display screen, wherein the displayed content window spans between the two dimensional physical display screen and the three dimensional virtual display screen, wherein the virtual object management step has a step of causing a display position of the virtual object on the second display section to be set, at a position located in a direction of extension from a boundary of the display data of the first display section displayed on the second display section to an outside of the first display section, wherein the virtual object management step transforms coordinate data, which is the positional information of the virtually displayed data stored in the memory, into a camera coordinate system serving as an indicator of a display position in a display image of the second display section, and determines the display position of the virtual object by applying the transformed coordinate data, and wherein the virtual object management step judges whether or not an intersection occurs between the display position of the virtual object transformed into the camera coordinate system, and a plane forming the real object included in the camera-captured image, and if the intersection occurs, executes a coordinate re-transformation process so as to position the transformed coordinate data in the plane forming the real object, and determines the display position of the virtual object by applying the re-transformed coordinate data.

5. The information processing apparatus of claim 1, comprising an application executing section configured to store virtually displayed data configured to be viewed from the virtual display unit and positional information of the virtually displayed data into a memory in data processing using a first display section of the physical display unit as at least one reference point for the positional information using the at least one processor.

6. The information processing apparatus of claim 5 where the virtually displayed data is displayed contiguous to display data displayed by the physical display unit.

7. The information processing apparatus of claim 1 wherein the real object is captured by a camera.

8. The information processing apparatus of claim 1, wherein the three-dimensional positional information of the physical display section is analyzed by the three-dimensional information analysis section and is configured to:

generate a composite image formed by the real object included in a camera-captured image and a virtual object formed by the virtually displayed data using the at least one processor; and display the composite image on a second display section using the at least one processor.

9. The information processing apparatus of claim 8, wherein the virtual object management section is configured to set a display position of the virtual object on the virtual display section at a position located in a direction of extension from a boundary of the display data of the physical display section displayed on the physical display section which is outside of the physical display section using the at least one processor.

* * * * *